(12) United States Patent
Brummel et al.

(10) Patent No.: US 7,731,420 B2
(45) Date of Patent: Jun. 8, 2010

(54) MEASURING DEVICE AND METHOD FOR DETERMINING TEMPERATURE AND/OR PRESSURE USING MEASURING DEVICE

(75) Inventors: Hans-Gerd Brummel, Berlin (DE); Uwe Linnert, Fürth (DE); Klaus Newerla, Nürnberg (DE); Michael Willsch, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 531 days.

(21) Appl. No.: 11/663,159

(22) PCT Filed: Sep. 13, 2005

(86) PCT No.: PCT/EP2005/054552

§ 371 (c)(1),
(2), (4) Date: Mar. 19, 2007

(87) PCT Pub. No.: WO2006/030011

PCT Pub. Date: Mar. 23, 2006

(65) Prior Publication Data

US 2009/0245323 A1    Oct. 1, 2009

(30) Foreign Application Priority Data

Sep. 17, 2004    (DE) .................... 10 2004 045 199

(51) Int. Cl.
*G01K 11/22* (2006.01)
(52) U.S. Cl. .................................. 374/117; 374/119
(58) Field of Classification Search ................. 374/117, 374/119
See application file for complete search history.

(56) References Cited

U.S. PATENT DOCUMENTS

| 3,595,069 | A | | 7/1971 | Fowler |
| 4,265,124 | A | | 5/1981 | Lim et al. |
| 4,399,441 | A | | 8/1983 | Vaughan et al. |
| 4,650,346 | A | | 3/1987 | Tehon |
| 4,691,714 | A | | 9/1987 | Wong et al. |
| 5,022,014 | A | * | 6/1991 | Kulczyk et al. ............... 367/87 |
| 5,349,859 | A | * | 9/1994 | Kleppe ...................... 73/597 |
| 6,786,633 | B2 | | 9/2004 | Wallen et al. |
| 6,789,426 | B2 | | 9/2004 | Yaralioglu et al. |

FOREIGN PATENT DOCUMENTS

| EP | 0 113 961 A1 | 7/1984 |
| EP | 1 231 456 A1 | 8/2002 |
| GB | 1 300 159 | 12/1972 |

OTHER PUBLICATIONS

JP2003042857A (Full Document).*
English Abstract for Japanese Patent Application Publication 2003042857 published on Feb. 13, 2003.
Office Action for German Application No. 10 2004 045 199.0-52; dated Apr. 26, 2005.

(Continued)

*Primary Examiner*—Gail Verbitsky
*Assistant Examiner*—Mirellys Jagan

(57) ABSTRACT

At least one transceiver sends ultrasonic pulses through an object, which at least partially transmits ultrasonic pulses, into an element which reflects the ultrasonic pulses. The ultrasonic pulse(s) can be reflected in a temperature-correlated manner from the reflective element to the transceiver.

30 Claims, 3 Drawing Sheets

OTHER PUBLICATIONS

International Search Report for Application No. PCT/EP2005/054552; mailed Jan. 2, 2006.

R. Nomura et al. "Temperature Dependence on Sound Velocity in High-Strength Fiber-Reinforced Plastics", Japan Journal of Applied Physics, vol. 42, Aug. 2003, pp. 5202-5207.

W. Buff et al., "Passive Remote Sensing for Temperature and Pressure Using SAW Resonator Devices", IEEE Trans. on Ultrasound, Ferroelectrics, and Frequency Control, Sep. 1998, vol. 45, No. 5, pp. 1388-1392.

J. Schreuer et al., Towards an understanding of the anomalous electromechanical behavior of LGS and related compounds at high temperatures, High Temperature SAW Conference, pp. 44-45.

Y.H. Kim et al. "Remote Temperature Sensing System Using Reverberated Magnetic Flux", IEEE Trans. on Magnetics, Sep. 2000 vol. 36, No. 5, pp. 3643-3645.

R.R. Fletcher et al., "Remotely Interrogated Temperature Sensors Based on Magnetic Materials", IEEE Trans. on Magnetics, Sep. 2000, vol. 36, No. 5, pp. 2794-2795.

* cited by examiner

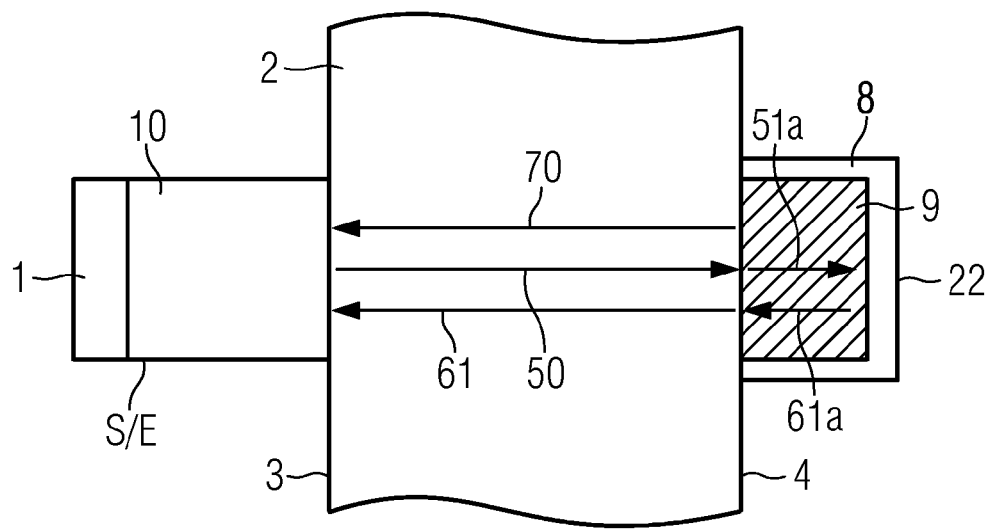
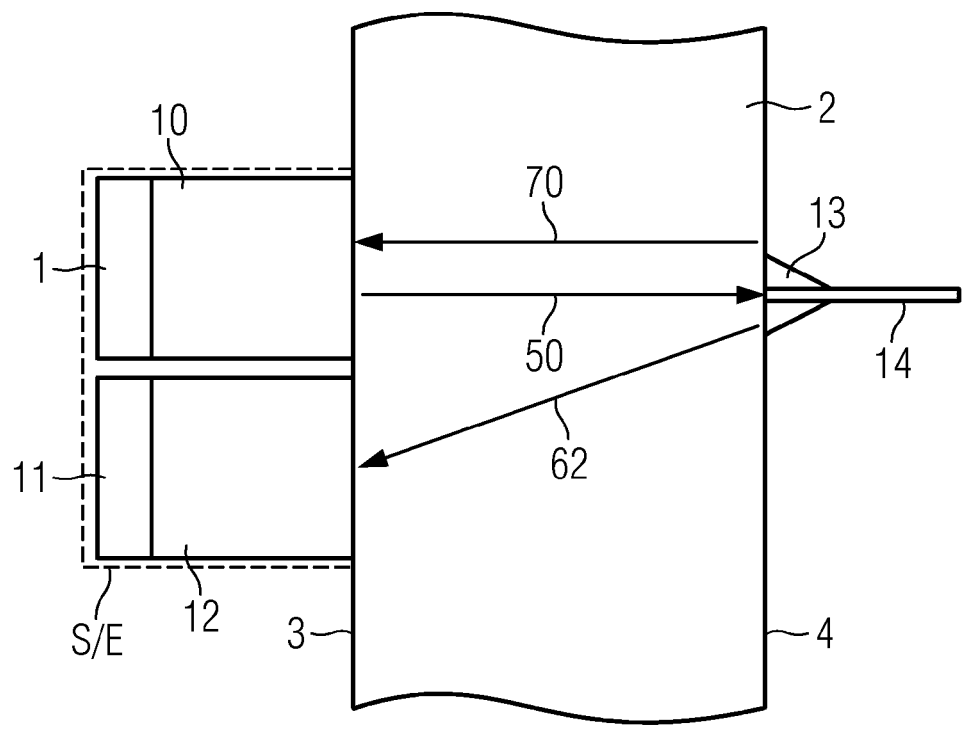

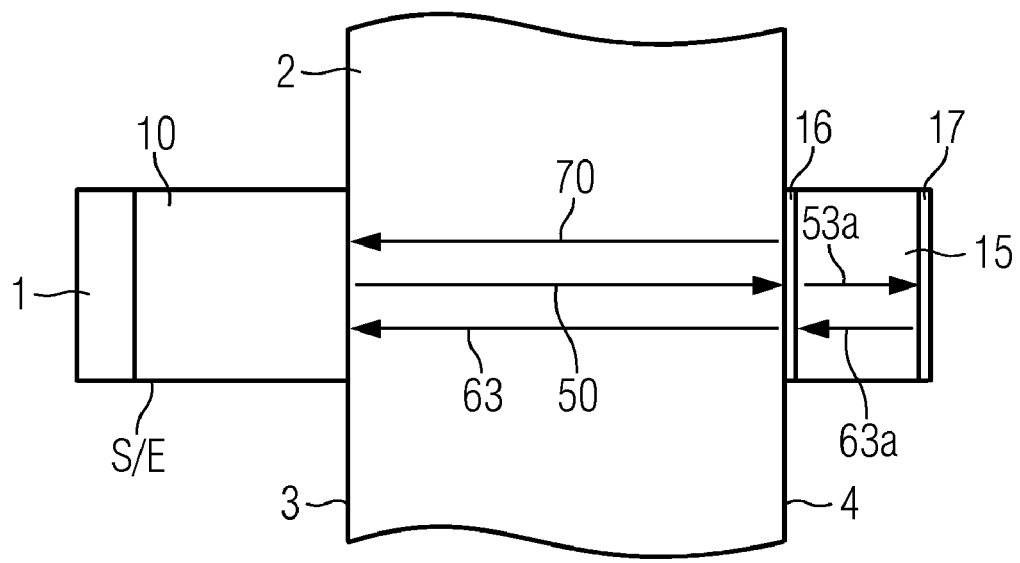
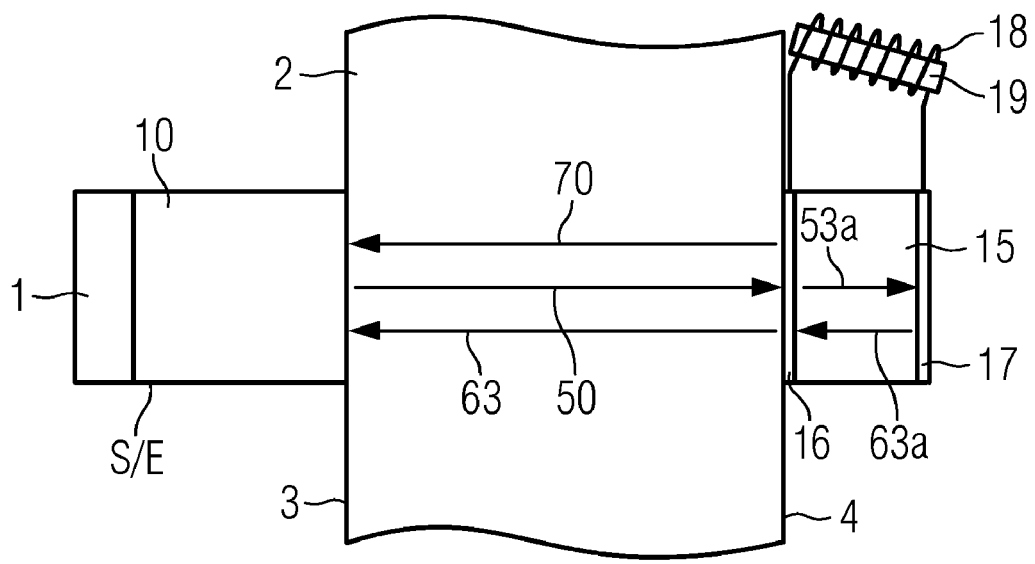

MEASURING DEVICE AND METHOD FOR DETERMINING TEMPERATURE AND/OR PRESSURE USING MEASURING DEVICE

CROSS REFERENCE TO RELATED APPLICATIONS

This application is based on and hereby claims priority to German Application No. 10 2004 045 199.0 filed on Sep. 17, 2004, the contents of which are hereby incorporated by reference.

BACKGROUND

Described below is a measuring device for determining temperature and/or pressure, with at least one transmission/reception unit for ultrasonic pulses and with at least one means for the reflection of ultrasonic pulses, and a method for operating the measuring device and to a use of the measuring device.

Turbomachines, such as, for example, steam or gas turbines, are used as thermal engines in industry in order to transfer an energy stored in a gas stream into a mechanical energy, in particular into a rotational movement. Furthermore, turbomachines, such as compressors, come under consideration, by which mechanical energy can be supplied to a gas stream. In order in gas turbines to achieve as high an overall efficiency as possible in terms of energy utilization, the gas inlet temperatures from the combustion chamber into the flow duct of the gas turbine are selected as high as possible. For example, the gas inlet temperatures lie above 1000° C.

This makes it necessary, under these high physical loads, for the turbomachine to be kept under observation during operation. In this case, in particular, the temperature and pressure measurement within the turbomachine delivers important information on the state of the turbomachine. For this purpose, as a rule, measuring probes mounted in the turbomachine are used, the signal and supply lines of which lead outward through the wall of the turbomachine by leadthroughs. A large number of temperature and pressure measurement points therefore requires a large number of leadthroughs and seals. Under the high physical loads, these always constitute error sources which are as far as possible to be avoided, in order to ensure that the turbomachine operates reliably.

SUMMARY

An aspect is to specify a measuring device and a method for operating the measuring device which allow as simple, as reliable and as cost-effective a temperature and/or pressure determination as possible, whereby the problem referred to above can be as far as possible overcome and the possibility of widespread use is afforded.

Accordingly, the measuring device for determining temperature and/or pressure, with at least
one transmission/reception unit for ultrasonic pulses and
one means for the reflection of ultrasonic pulses, is to be designed to the effect that
at least one ultrasonic pulse can be transmitted from the transmission/reception unit through an object into the reflection means,
the object is at least partially transmitting in respect of ultrasonic pulses, and
the at least one ultrasonic pulse can be reflected in a temperature-correlated manner from the reflection means in the direction of the transmission/reception unit.

Since a temperature-sensitive and/or pressure-sensitive passive measurement transducer can be interrogated through an object, in particular through a metallic wall, by ultrasonic pulses, the advantages associated with this are to be seen particularly in an avoidance of leadthroughs and of seals, necessarily accompanying these, in the object, in particular in the metallic wall.

It is advantageous particularly that the transmission/reception unit has at least one sound transducer. Preferably, the transmission/reception unit has at least two sound transducers.

In this case, it is advantageous that the measuring device has at least one first sound transducer for transmitting the at least one ultrasonic pulse through the object into the reflection means and at least one second sound transducer for receiving the at least one ultrasonic pulse, reflected in a temperature-correlated manner, from the reflection means.

It is also advantageous that the measuring device has at least one sound transducer both for transmitting the at least one ultrasonic pulse through the object into the reflection means and for receiving the at least one ultrasonic pulse, reflected in a temperature-correlated manner, from the reflection means.

It proves advantageous that the transmission/reception unit has an acoustic waveguide arranged between the sound transducer and the object.

It is advantageous that the at least one ultrasonic pulse can be focused into the reflection means.

Advantageously, the reflection means is designed as a container with a thermally conductive wall and with an orifice facing the object, the container containing a material, the sound velocity of which has a higher temperature coefficient with respect to the object, in particular at least 10 times higher.

It is also advantageous that the reflection means comprises a surface wave resonator and an acoustic mode transformer or a piezoelectric transformer, the acoustic mode transformer or the piezoelectric transformer being provided for transmitting the at least one ultrasonic pulse between the surface wave resonator and the object.

It proves particularly advantageous that the reflection means is a piezoelectric oscillator, in particular a piezoelectric thickness oscillator, which is provided with two electrodes and which can be excited into resonant oscillation by at least one ultrasonic pulse, in which case the at least one ultrasonic pulse should have a broad frequency band.

In this case, preferably, the two electrodes are connected to an inductance.

Moreover, preferably, the inductance is provided with a core, the magnetic properties of which, in particular the susceptibility, are temperature-dependent.

The core is in this case preferably a magnetoelastic core, and it is arranged on the object in such a way that it can be excited into oscillation by the at least one ultrasonic pulse.

It is advantageous, further, that a capacitance is arranged between one electrode of the piezoelectric oscillator and one terminal of the inductance.

The object is preferably provided on the side facing the reflection means with a recess in which the reflection means is arranged.

In this case, the reflection means is preferably arranged with a form fit in the recess.

The measuring device advantageously has control means for activating the at least one transmission/reception unit.

Advantageously, moreover, the measuring device has signal preparation means for the preparation of measurement signals generated in the at least one transmission/reception unit.

Further, the measuring device advantageously has signal transmission means for transmitting the prepared measurement signals.

Furthermore, the measuring device advantageously has signal processing means for evaluating the transmitted measurement signals.

In a method for operating the measuring device, at least one ultrasonic pulse is transmitted from the transmission/reception unit through the object into the reflection means and is reflected in a temperature-correlated manner from the reflection means in the direction of the transmission/reception unit.

Moreover, the measuring device may be used for determining temperature and/or pressure in a turbomachine, in particular a gas or steam turbine.

BRIEF DESCRIPTION OF THE DRAWINGS

Preferred, but in no way restrictive exemplary embodiments of the device are now explained in more detail with reference to the drawing. For the clarification, the drawing is not to scale and some features are illustrated diagrammatically. In particular, FIG. 1 is a top view of a measuring arrangement with a material-containing container providing reflection of ultrasonic pulses, FIG. 2 is a top view of a measuring arrangement with a surface wave resonator and an acoustic mode transformer or a piezoelectric transformer providing reflection of ultrasonic pulses, FIG. 3 is a top view of a measuring arrangement with a piezoelectric oscillator providing reflection of ultrasonic pulses, FIG. 4 is a top view of a measuring arrangement with a piezoelectric oscillator and an inductance, connected to the oscillator and provided with a core, providing reflection of ultrasonic pulses.

DETAILED DESCRIPTION OF THE PREFERRED EMBODIMENT

Figure 5:
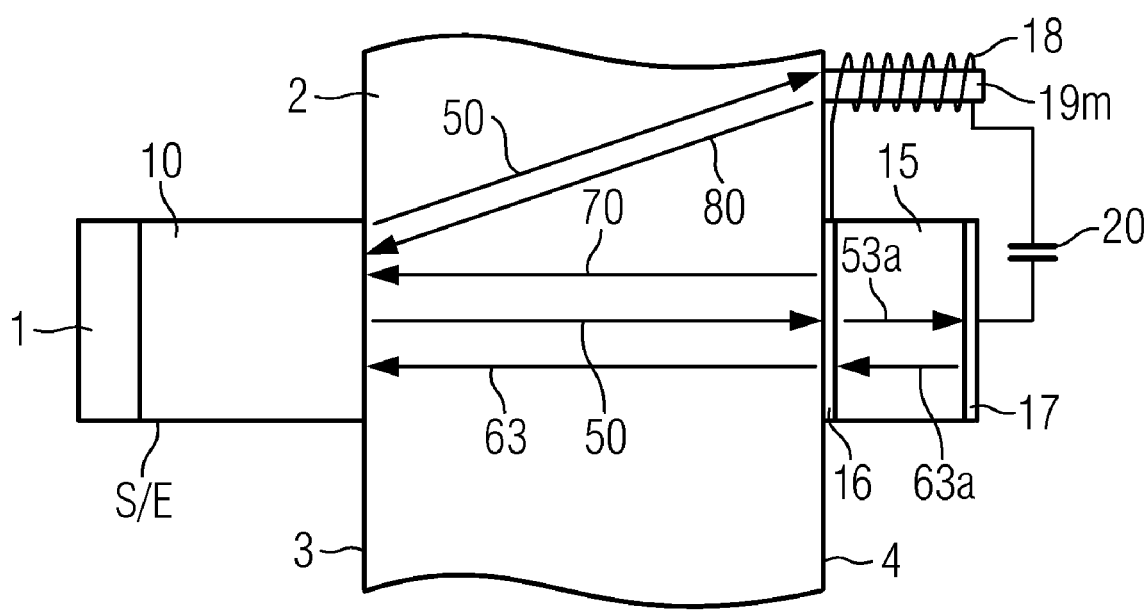
FIG. 5 is a top view of a measuring arrangement with a piezoelectric oscillator, which is connected to an inductance provided with a core and to a capacitance, providing reflection of ultrasonic pulses.

Reference will now be made in detail to the preferred embodiments, examples of which are illustrated in the accompanying drawings, wherein like reference symbols refer to like elements throughout.

FIG. 1 illustrates a measuring arrangement with a reflection means which is a container filled with a material. The material in this case has a sound velocity with a significant temperature coefficient. Reference is made in this respect to "Temperature Dependence of Sound Velocity in High-Strength Fiber-Reinforced Plastics" R. Nomura, K. Yoneyama et al., Jpn. J. Appl. Phys. Vol. 42 (2003) pp. 5205-5207. Moreover, the, in particular, pressure-shielded container has a wall with good thermal conductivity. In FIG. 1, reference characters S/E designate a transmission/reception unit, 1 designates an ultrasonic transducer, 2 designates an object, 3 and 4 each designate an object surface, 50, 51a, 61, 61a and 70 designate an ultrasonic pulse or an ultrasonic pulse fraction, 8 designates a wall, 9 designates filling material, 10 designates an acoustic waveguide, and 22 designates a container.

At least one ultrasonic pulse is transmitted from a transmission/reception unit in the direction of the container, is reflected within the container and is detected again by the transmission/reception unit. The transmission/reception unit in this case includes an ultrasonic transducer, particularly in the form of a piezoelectric or magnetostrictive transducer system. Reference is made, in this respect, to "Physik und Technik des Ultraschalls" ["Physics and Technology of Ultrasound"], H. Kuttruff, S. Hirzel Verlag Stuttgart, 1988, pp. 132-137. So that as high a fraction as possible of the at least one ultrasonic pulse irradiated into the object penetrates into the container and is reflected on the rear wall of the container, the internal material of the container is attached with good acoustic impedance matching to the object surface facing away from the transmission/reception unit. Focusing of the at least one ultrasonic pulse onto the container in this case advantageously promotes efficiency. By the selection of reflected ultrasonic pulse fractions from the object surface on which the container is mounted and of the reflected ultrasonic pulse fractions from the container, the transit time in the filling material can be extracted and, with a knowledge of the acoustic parameters, in particular the temperature-dependent sound velocity of the filling material and the dimensions of the container, constitutes a measure of the temperature surrounding the container. Thus, provided that there has been prior calibration, the temperature surrounding the container can be deduced from the transit time in the filling material. To increase accuracy by redundancy, it is advantageous, so as to separate the influence of thermal expansion and a change in sound velocity, to mount at the same temperature location two containers, one of which is filled with a material having a high temperature coefficient of sound velocity, but low thermal expansion, and the second of which is filled with a material having a high temperature coefficient of thermal expansion, but a stable sound velocity, and the measurements of which are to be compared. If back calculation is not possible analytically, comparison may be made with tabulated laboratory measurements.

FIG. 2 illustrates a measuring arrangement with a reflection means which comprises a surface wave resonator and an acoustic mode transformer or a piezoelectric transformer. In FIG. 2, reference numeral 11 designates a further ultrasonic transducer, 62 an ultrasonic pulse or ultrasonic pulse fraction, 12 a further acoustic waveguide, 13 an acoustic mode transformer or a piezoelectric transformer, and 14 a surface wave resonator.

The piezo material of surface wave resonators, which are also known as SAW (Surface Acoustic Waves) resonators, can, as is known, be configured such that their resonant frequencies dependent on temperature or pressure, and SAW components are used in this sense for remote sensing. Reference is made in this respect to "Passive Remote Sensing for Temperature and Pressure Using SAW Resonator Devices" W. Buff, S. Klett, M. Rusko et al., IEEE Trans. on Ultrasound, Ferroel. And Frequ. Control, Vol. 45, No. 5, September 1998. SAW materials, such as, for example, LGS (La3Ga5SiO14) and LGT (La3TaO.5Ga5.5014), which have been investigated up to 1000° K, come under consideration in this regard. Reference is made in this respect to "Towards an understanding of the anomalous electromechanical behaviour of LGS and related compounds at high temperatures" J. Schreuer, C., Thybaut, M. Prestat et al., Goethe University Frankfurt, ETH Zurich, University of Cologne, Konferenzbeitrag: High Temperature SAW. SAW resonators formed of the latter materials, with frequencies which also allow a sufficiently low-damping transmission through the object, are mounted onto the object surface facing away from the transmission/reception unit and are excited by an, in particular, energy-rich ultrasonic pulse through the object, and their acoustic oscillation, likewise through the object, is monitored by the same or a second ultrasonic transducer, the second ultrasonic transducer being optimized as a reception transducer. The transmission of the ultrasonic pulse transmitted by the transmission/reception unit to the SAW resonator and the response of the SAW resonator may take place either by an acoustic mode transformer or electrically via a piezoelectric transformer, in particular an ultrasonic transducer, interposed on the object surface facing away from the transmission/reception unit.

FIG. 3 illustrates a measuring arrangement with a reflection means which comprises a piezo-electric oscillator, in particular a piezoelectric thickness oscillator, provided with two electrodes. In FIG. 3, reference characters 53a, 63 and 63a designate an ultrasonic pulse or ultrasonic pulse fraction, 15 designates a piezoelectric (thickness) oscillator or piezoelectric resonator, and 16 and 17 designate an electrode.

A piezoelectric thickness oscillator formed of temperature-resistant material, such as, for example, the abovementioned LGS and LGT, under the influence of temperature and pressure changes its sound velocity and geometric dimension and therefore its resonant frequency. Reference is made in this respect to "Piezoxide (PXE) Eigenschaften und Anwendungen" ["Piezo-oxides (PXE) Properties and Applications"], Valvo Manual, J. Koch, ISBN 3-7785-1755-4. This is mounted, coupled in an acoustically beneficial way, on the object surface facing away from the transmission/reception unit and is excited, particularly over a broad band, by an, in particular, short ultrasonic pulse. In accordance with its high quality, its excitation diminishes with its characteristic frequency which can be received by the transmission/reception unit by the exciting ultrasonic transducer or a second ultrasonic transducer and constitutes a measure of the internal temperature.

FIG. 4 illustrates a measuring arrangement with a reflection means which comprises a piezoelectric oscillator, its two electrodes being connected to an inductance which is provided with a core, the magnetic properties of which are temperature-dependent. In FIG. 4, reference numeral 18 designates an inductance and 19 a core or inductance core.

It is known to vary the resonant frequency of a piezoelectric resonator by coupling an electrical oscillating circuit. Reference is made in this respect to "Piezoxide (PXE) Eigenschaften und Anwendungen" (cited above). Inductive elements or magnetoelastic elements are likewise known, the inductance or resonance of which changes under the influence of temperature on account of a significant temperature coefficient of the core material or of other magnetic materials. Reference is made in this respect to "Remote Temperature Sensing System Using Reverberated Magnetic Flux" Y. H. Kim, S. Hashi, K. Ishiyama et al., IEEE Trans. on Magnetics, Vol. 36, No. 5 September 2000 and "Remotely Interrogated Temperature Sensors Based on Magnetic Materials", R. R. Fletcher, N. A. Gershenfeld, IEEE Trans. on Magnetics, Vol. 36, No. 5, September 2000. It is therefore advantageous to couple an element of this type electrically to the piezoelectric resonator illustrated in FIG. 3, in order to intensify a frequency change influenced by the temperature or, in the case of the supercritical coupling, to measure the differential frequency of the multiple resonances and thus the measurement dynamics or measurement resolution.

FIG. 5 illustrates a measuring arrangement with a reflection means which comprises a piezoelectric oscillator, it's two electrodes being connected to an inductance which is provided with a magnetoelastic core. What is depicted, further, is that a capacitance is arranged between an electrode of the piezoelectric oscillator and a terminal of the inductance. In FIG. 5, reference numeral 80 designates an ultrasonic pulse or ultrasonic pulse fraction, 19m a magnetoelastic core or magnetoelastic resonator, and 20 a capacitance.

In a development of the exemplary embodiment illustrated in FIG. 4, it is conceivable to couple the magnetoelastic core, which at the same time is also a magnetoelastic resonator, and also the piezoelectric oscillator acoustically to the object surface facing away from the transmission/reception unit and, by the electrical coupling of the two resonators, to intensify further the resonant detuning effect or refine the detection of the latter.

For the special instance of the temperature measurement of gases, moreover, it is conceivable to couple electrically to the piezoelectric oscillator a capacitive ultrasonic resonator, the resonant frequency of which is determined by the temperature dependence of the filling gas. Reference is made as regards the capacitive ultrasonic resonator to "Physik und Technik des Ultraschalls" (cited above). In principle, as according to the exemplary embodiment from FIG. 1, a possible additional influence as a result of a changing atmospheric pressure can be avoided by a pressure-proof but heat-conducting wall.

If the object surface facing the transmission/reception unit has an increased temperature which, for example in gas turbines, may lie in the region of a few 100° C., then, in all the exemplary embodiments described above according to FIGS. 1 to 5, there is the possibility that the respective ultrasonic transducer must be positioned at some distance in order to avoid its destruction. In this case, the ultrasonic pulse generated by the ultrasonic transducer may be coupled into the object with the aid of an acoustic waveguide (Active Wave Guides).

In all the exemplary embodiments described above according to FIGS. 1 to 5, alternatively, to fasten the reflection means to the object surface, this reflection means may also be arranged in a corresponding recess with which the object is to be provided for this purpose on the side facing away from the transmission/reception unit. In particular, the reflection means may be arranged with a form fit in the clearance. A corresponding clearance for the magnetoelastic core according to FIG. 5 may likewise be envisaged.

All the exemplary embodiments described above according to FIGS. 1 to 5 are suitable for temperature measurements in which the object surface facing away from the transmission/reception unit has a temperature of about 1000° C.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d870, 69 USPQ2d 1865 (Fed. Cir. 2004).

The invention claimed is:

1. A measuring device for determining temperature through a wall at least partially transmissive of ultrasonic pulses, comprising:

reflection means, arranged on a surface of the wall, for reflecting ultrasonic pulses in a temperature-correlated manner; and a transmission/reception unit, arranged on the wall with the wall surface on which said reflection means is arranged facing away from said transmission/reception unit, transmitting at least one ultrasonic pulse through the wall to said reflection means and receiving at least a fraction of the at least one ultrasonic pulse reflected in the temperature-correlated manner from said reflection means towards said transmission/reception unit,
wherein said reflection means comprises a container with a thermally conductive wall and an orifice facing the wall, the container containing a material, the sound velocity of which has a higher temperature coefficient than the wall.

2. The measuring device as claimed in claim 1,
wherein said reflection means has a pressure-sensitive design, and
wherein said transmission/reception unit further determines pressure through the wall.

3. The measuring device as claimed in claim 1, further comprising control means for activating said transmission/reception unit.

4. The measuring device as claimed in claim 1, wherein said transmission/reception unit comprises at least two sound transducers.

5. The measuring device as claimed in claim 4, wherein the at least two sound transducers comprise
at least one first sound transducer transmitting the at least one ultrasonic pulse through the wall into the reflection means; and
at least one second sound transducer receiving the at least a fraction of the at least one ultrasonic pulse, reflected in the temperature-correlated manner, from said reflection means.

6. The measuring device as claimed in claim 1, wherein said transmission/reception unit comprises at least one sound transducer.

7. The measuring device as claimed in claim 6, wherein the at least one sound transducer both transmits the at least one ultrasonic pulse through the wall into said reflection means and receives the at least a fraction of the at least one ultrasonic pulse, reflected in the temperature-correlated manner, from said reflection means.

8. The measuring device as claimed in claim 7, wherein said transmission/reception unit further comprises an acoustic waveguide arranged between the at least one sound transducer and the wall.

9. The measuring device as claimed in claim 8, wherein said transmission/reception unit transmits the at least one ultrasonic pulse focused into the reflection means.

10. The measuring device as claimed in claim 1, further comprising signal preparation means for preparation of measurement signals generated in said transmission/reception unit.

11. The measuring device as claimed in claim 10, further comprising signal transmitting means for transmitting the measurement signals.

12. The measuring device as claimed in claim 10, further comprising signal processing means for evaluating the measurement signals.

13. A measuring device for determining temperature through a wall at least partially transmissive of ultrasonic pulses, comprising:
reflection means, arranged on a surface of the wall, for reflecting ultrasonic pulses in a temperature-correlated manner; and
a transmission/reception unit, arranged on the wall with the wall surface on which said reflection means is arranged facing away from said transmission/reception unit, transmitting at least one ultrasonic pulse through the wall to said reflection means and receiving at least a fraction of the at least one ultrasonic pulse reflected in the temperature-correlated manner from said reflection means towards said transmission/reception unit, wherein said reflection means comprises:
a surface wave resonator; and
one of an acoustic mode transformer and a piezoelectric transformer, transmitting the at least one ultrasonic pulse between the surface wave resonator and the wall.

14. The measuring device as claimed in claim 13, wherein said transmission/reception unit comprises at least one sound transducer.

15. The measuring device as claimed in claim 13, wherein said transmission/reception unit comprises at least two sound transducers.

16. The measuring device as claimed in claim 13,
wherein said reflection means has a pressure-sensitive design, and
wherein said transmission/reception unit further determines pressure through the wall.

17. The measuring device as claimed in claim 13, further comprising control means for activating said transmission/reception unit.

18. The measuring device as claimed in claim 13, further comprising signal preparation means for preparation of measurement signals generated in said transmission/reception unit.

19. A measuring device for determining temperature through a wall at least partially transmissive of ultrasonic pulses, comprising:
reflection means, arranged on a surface of the wall, for reflecting ultrasonic pulses in a temperature-correlated manner; and
a transmission/reception unit, arranged on the wall with the wall surface on which said reflection means is arranged facing away from said transmission/reception unit, transmitting at least one ultrasonic pulse through the wall to said reflection means and receiving at least a fraction of the at least one ultrasonic pulse reflected in the temperature-correlated manner from said reflection means towards said transmission/reception unit, wherein said reflection means comprises a piezoelectric oscillator having two electrodes and being excited into resonant oscillation by the at least one ultrasonic pulse.

20. The measuring device as claimed in claim 19, wherein said transmission/reception unit comprises at least one sound transducer.

21. The measuring device as claimed in claim 19, wherein said transmission/reception unit comprises at least two sound transducers.

22. The measuring device as claimed in claim 19,
wherein said reflection means has a pressure-sensitive design, and
wherein said transmission/reception unit further determines pressure through the wall.

23. The measuring device as claimed in claim 19, further comprising control means for activating said transmission/reception unit.

24. The measuring device as claimed in claim 19, further comprising signal preparation means for preparation of measurement signals generated in said transmission/reception unit.

25. The measuring device as claimed in claim 19, wherein said reflection means further comprises an inductance connected to the two electrodes.

26. The measuring device as claimed in claim 25, wherein the inductance has a core with temperature-dependent magnetic properties.

27. The measuring device as claimed in claim 26, wherein the inductance has a magneto elastic core arranged on the wall so that the magneto elastic core is excited into oscillation by the at least one ultrasonic pulse.

28. The measuring device as claimed in claim 27, wherein said reflection means further comprises a capacitance arranged between one of the electrodes of the piezoelectric oscillator and a terminal of the inductance.

29. The measuring device as claimed in claim 28, wherein the reflection means is arranged in a recess of the wall.

30. The measuring device as claimed in claim 29, wherein the reflection means is arranged with a form fit in the recess.

* * * * *